US010408957B2

(12) United States Patent
Ma et al.

(10) Patent No.: US 10,408,957 B2
(45) Date of Patent: Sep. 10, 2019

(54) ANALYSIS OF MICROSEISMIC SUPPORTED STIMULATED RESERVOIR VOLUMES

(71) Applicant: Halliburton Energy Services, Inc., Houston, TX (US)

(72) Inventors: Jianfu Ma, Pearland, TX (US); Avi Lin, Houston, TX (US); Baidurja Ray, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 347 days.

(21) Appl. No.: 15/502,102

(22) PCT Filed: Sep. 12, 2014

(86) PCT No.: PCT/US2014/055433
§ 371 (c)(1),
(2) Date: Feb. 6, 2017

(87) PCT Pub. No.: WO2016/039773
PCT Pub. Date: Mar. 17, 2016

(65) Prior Publication Data
US 2017/0227663 A1    Aug. 10, 2017

(51) Int. Cl.
*E21B 43/26* (2006.01)
*G01V 1/28* (2006.01)
(Continued)

(52) U.S. Cl.
CPC ............ *G01V 1/288* (2013.01); *E21B 33/068* (2013.01); *E21B 43/26* (2013.01); *E21B 49/00* (2013.01);
(Continued)

(58) Field of Classification Search
CPC ................................ E21B 43/26; G01V 1/288
See application file for complete search history.

(56) References Cited

U.S. PATENT DOCUMENTS

| 2011/0029291 A1 | 2/2011 | Weng et al. |
| 2011/0120702 A1* | 5/2011 | Craig ...................... E21B 43/26 |
| | | 166/250.1 |

(Continued)

FOREIGN PATENT DOCUMENTS

| WO | 2011/077223 A2 | 6/2011 |
| WO | 2012/141720 A1 | 10/2012 |

OTHER PUBLICATIONS

International Preliminary Report on Patentability issued in related PCT Application No. PCT/US2014/055433 dated Mar. 23, 2017, 12 pages.

(Continued)

*Primary Examiner* — Giovanna C Wright
(74) *Attorney, Agent, or Firm* — John Wustenberg; Baker Botts L.L.P.

(57) ABSTRACT

In accordance with some embodiments of the present disclosure, a method of modeling a downhole drilling tool is disclosed. The method may include obtaining microseismic data corresponding to a treatment of a subterranean region, the microseismic data including a microseismic event time for each of a plurality of microseismic events, and a microseismic event location for each of the plurality of microseismic events. The method may additionally include calculating a plurality of fracture planes based upon the microseismic event times, and calculating a closed boundary enclosing a first subset of the plurality of fracture planes. The method may further include identifying a microseismic supported stimulated reservoir volume (μSRN) for the treatment based on the closed boundary.

20 Claims, 10 Drawing Sheets

(51) Int. Cl.
  E21B 33/068    (2006.01)
  E21B 49/00     (2006.01)
  E21B 47/00     (2012.01)
  E21B 47/06     (2012.01)
  E21B 49/08     (2006.01)

(52) U.S. Cl.
  CPC ......... *E21B 47/0002* (2013.01); *E21B 47/06* (2013.01); *E21B 49/006* (2013.01); *E21B 49/08* (2013.01); *G01V 2210/123* (2013.01); *G01V 2210/1234* (2013.01); *G01V 2210/646* (2013.01)

(56) References Cited

U.S. PATENT DOCUMENTS

| | | | |
|---|---|---|---|
| 2011/0120705 A1 | 5/2011 | Walters et al. | |
| 2012/0318500 A1* | 12/2012 | Urbancic | E21B 43/26 166/250.1 |
| 2013/0081805 A1* | 4/2013 | Bradford | G01V 1/40 166/250.1 |
| 2013/0231910 A1* | 9/2013 | Kumar | G06F 19/00 703/10 |
| 2014/0098638 A1 | 4/2014 | Ma et al. | |
| 2014/0100786 A1 | 4/2014 | Ma et al. | |
| 2014/0358510 A1* | 12/2014 | Sarkar | G06F 17/5009 703/10 |
| 2015/0055436 A1* | 2/2015 | Ma | G01V 1/30 367/25 |
| 2015/0057933 A1* | 2/2015 | Ma | E21B 43/26 702/11 |
| 2015/0057985 A1* | 2/2015 | Ma | E21B 43/26 703/2 |
| 2015/0276979 A1* | 10/2015 | Hugot | G01V 1/301 703/6 |

OTHER PUBLICATIONS

Mayerhofer, Michael J., et al. "What is stimulated reservoir volume?." SPE Paper 119890. SPE Production & Operations 25.01 (2010): 89-98.

Zimmer, Ulrich. "Calculating stimulated reservoir volume (SRV) with consideration of uncertainties in microseismic-event locations." CSUG/SPE Paper 148610. Canadian Unconventional Resources Conference. Society of Petroleum Engineers, 2011.

Cheng, Yueming. "Impacts of the number of perforation clusters and cluster spacing on production performance of horizontal shale-gas wells." SPE Paper 138843. SPE Reservoir Evaluation & Engineering 15.01 (2012): 31-40.

Dusseault, Maurice, John McLennan, and Jiang Shu. "Massive multi-stage hydraulic fracturing for oil and gas recovery from low mobility reservoirs in China." Petroleum Drilling Techniques 39.3 (2011): 6-16.

Maxwell, Shawn C., et al. "Enhanced reservoir characterization using hydraulic fracture microseismicity." SPE Hydraulic Fracturing Technology Conference. SPE Paper 140449. Society of Petroleum Engineers, 2011.

Williams, Michael J., Bassem Khadhraoui, and Ian Bradford. "Quantitative interpretation of major planes from microseismic event locations with application in production prediction." SEG Technical Program Expanded Abstracts 2010. Society of Exploration Geophysicists, 2010. 2085-2089.

Zimmer, Ulrich, et al. "Microseismic Quality Control Reports as an Interpretive Tool for Nonspecialists." SPE Annual Technical Conference and Exhibition. SPE Paper 110517. Society of Petroleum Engineers, 2007.

International Search Report and Written Opinion issued in related PCT Application No. PCT/US2014/055433 dated May 29, 2015, 15 pages.

* cited by examiner

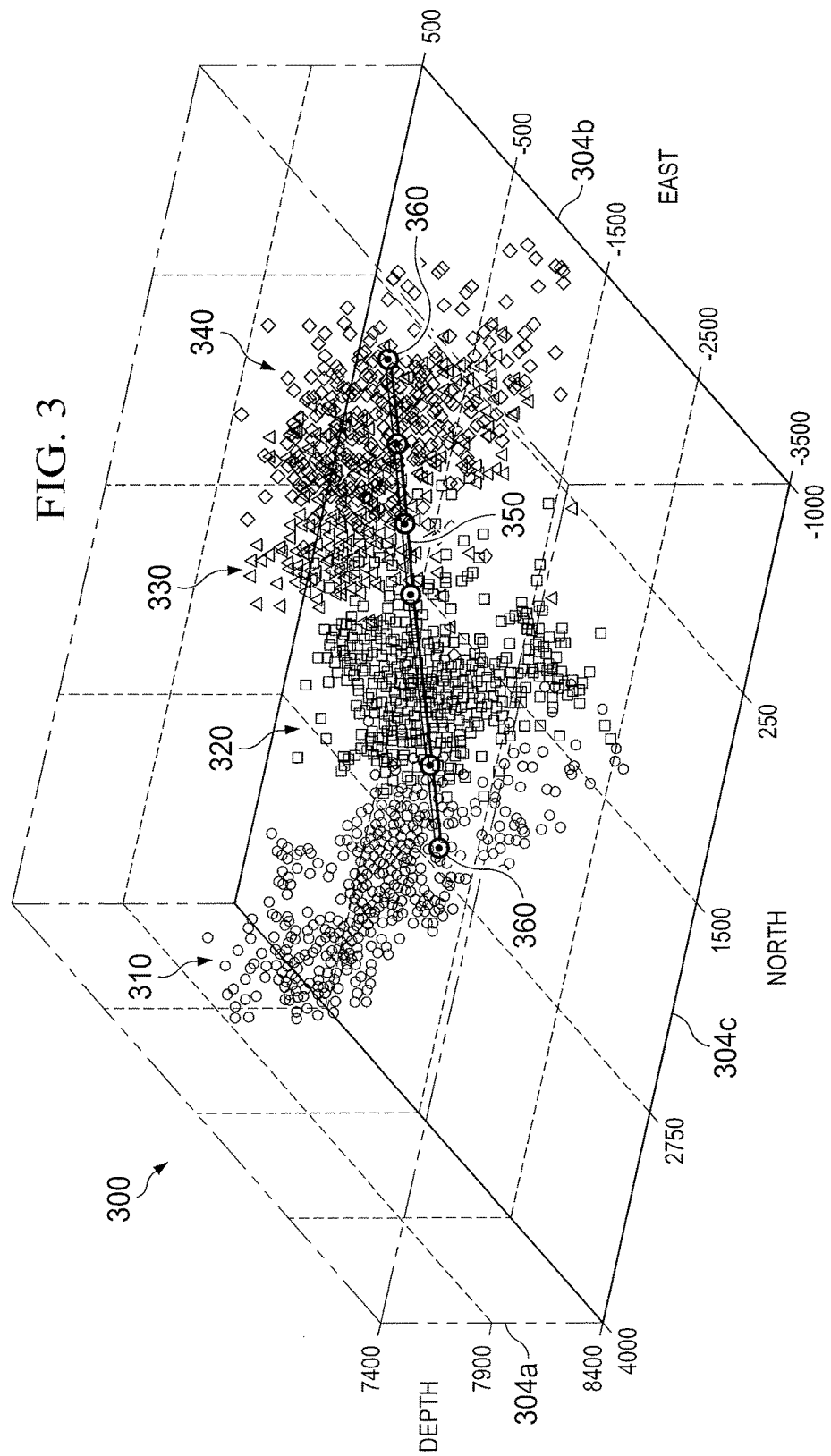

ANALYSIS OF MICROSEISMIC SUPPORTED STIMULATED RESERVOIR VOLUMES

CROSS-REFERENCE TO RELATED APPLICATION

The present application is a U.S. National Stage Application of International Application No. PCT/US2014/055433 filed Sep. 12, 2014, which is incorporated herein by reference in its entirety for all purposes.

TECHNICAL FIELD

The present disclosure relates generally to analysis of stimulated reservoir volumes and, more particularly, to analysis of microseismic supported stimulated reservoir volumes.

BACKGROUND

Microseismic data are often acquired in association with stimulation treatments applied to a subterranean formation. The injection treatments are typically applied to induce fractures in the subterranean formation, and thereby enhance hydrocarbon productivity of the subterranean formation. Pressures generated by a stimulation treatment may induce low-amplitude or low-energy seismic events in the subterranean formation, and events may be detected by sensors and collected for analysis.

BRIEF DESCRIPTION OF THE DRAWINGS

For a more complete understanding of the present disclosure and its features and advantages, reference is now made to the following description, taken in conjunction with the accompanying drawings, in which:

FIG. 3 is a plot of exemplary microseismic event data collected from a multistage treatment, in accordance with some embodiments of the present disclosure;

DETAILED DESCRIPTION

Figure 1A:
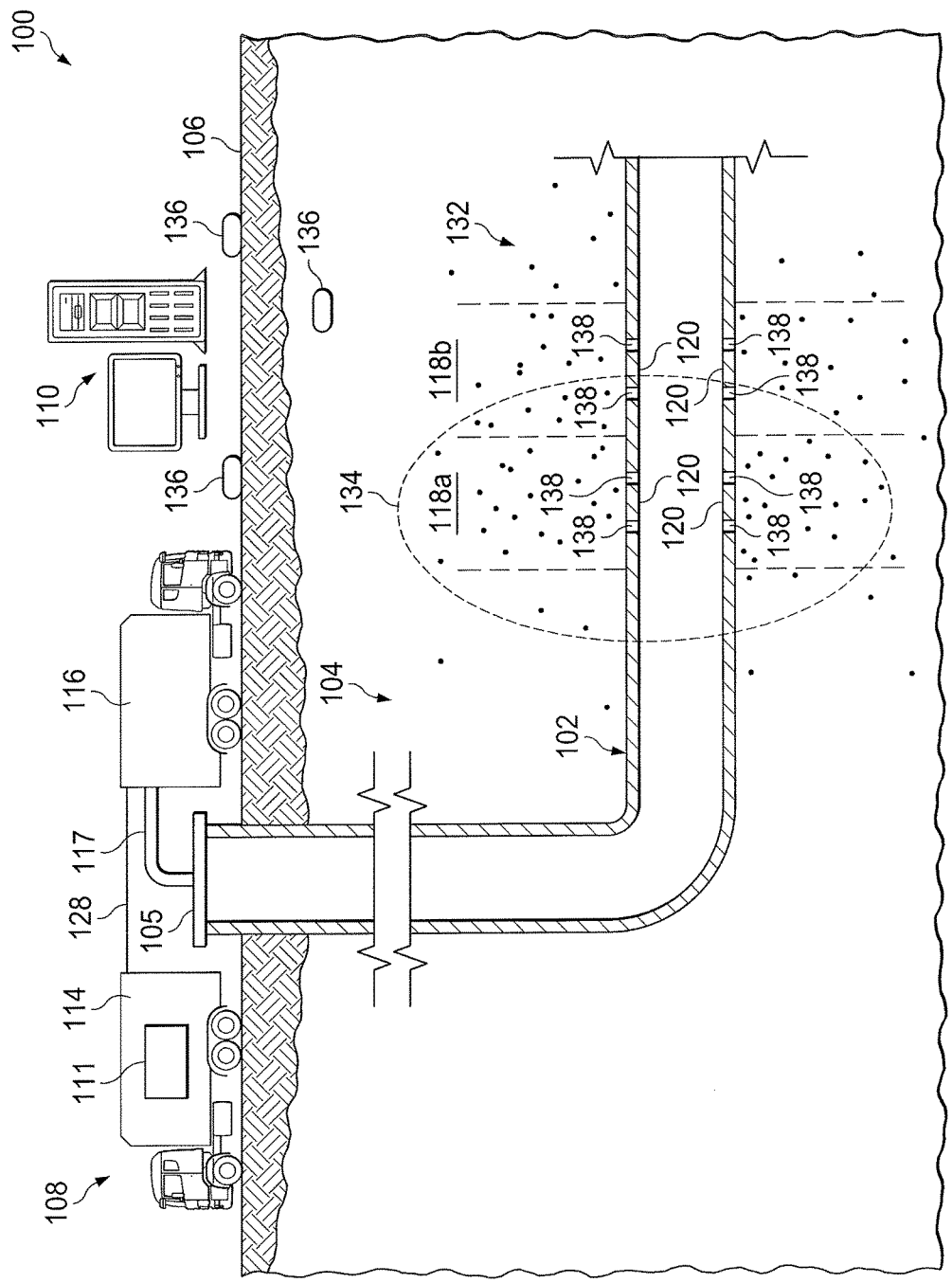
FIG. 1A shows a cross section of an exemplary well system, in accordance with some embodiments of the present disclosure.

In some aspects of the present disclosure, a microseismic supported stimulated reservoir volume (μSRV) for a treatment of a subterranean region is approximated and calculated from microseismic data. In some embodiments, a treatment fractures part of a rock formation or other materials in a subterranean region. Fracturing a rock may increase the surface area of a formation, which may increase the rate at which the formation conducts hydrocarbon resources to a wellbore. A μSRV may be proportional to or otherwise indicate the volume of a subterranean region that was effectively stimulated and fractured, or otherwise affected by a stimulation treatment. For example, a μSRV may represent a volume in which fractures or fracture networks were created, dilated, or propagated by a stimulation treatment. A μSRV may represent a volume of a subterranean region contacted by treatment fluid from a stimulation treatment. In some embodiments, a μSRV may be obtained based on a volume of a cloud of microseismic events associated with fracture planes generated by a stimulation treatments.

In some embodiments, a μSRV may be used to evaluate the efficiency of an injection treatment and to assess treatment performance. For example, a more consistent and accurate estimation or prediction of μSRV may provide a useful tool for analyzing a stimulated reservoir. In some embodiments, geometric properties of a μSRV, μSRV overlaps, or dynamic properties of a μSRV, or other types of information are approximated based on calculations from microseismic data. In some embodiments, a μSRV overlap, geometric properties of a μSRV, or dynamic properties of a μSRV are dynamically identified and displayed, for example, in real-time during a stimulation treatment. In some embodiments, techniques described herein may provide users (e.g., field engineers, operational engineers and analysts, and others) with a reliable and direct tool to visualize a stimulated reservoir geometry and treatment field development, to evaluate efficiency of hydraulic fracturing treatments, to modify or otherwise manage a treatment plan, or to perform other types of analysis or design.

An exemplary process for analyzing a μSRV based on microseismic event data is represented in the figures and corresponding description of FIGS. 1-8. In some embodiments, a set of initial fracture planes may be estimated based upon microseismic data. An iterative matching algorithm may be used to merge initial fracture planes as microseismic events accumulate. In some embodiments, particular microseismic events may not be associated with a merged fracture plane, and these unassociated microseismic events may be excluded from further analyses of a subterranean region. In some embodiments, a confidence value may be calculated for each fracture plane, and fracture planes with confidence values below a threshold confidence value may also be excluded from further analyses of a subterranean region. In some embodiments, based upon microseismic data associated with fracture planes with confidence values over a threshold confidence value, a μSRV may be identified. In some embodiments, a μSRV may be represented geometrically, where the geometrical representation may include a boundary (e.g., a surface, a 3D convex hull, a 2D polyhedron, etc.) enclosing microseismic event locations associated with μSRV. In some embodiments, based upon microseismic events times, dynamic properties of individual fracture planes included in a μSRV may be calculated or plotted.

FIG. 1A shows a cross section of an exemplary well system 100, in accordance with some embodiments of the present disclosure. Well system 100 may include wellbore 102 in subterranean region 104 beneath ground surface 106. Wellbore 102, as shown in FIG. 1A, may include a horizontal wellbore. However, a well system may include any combination of horizontal, vertical, slant, curved, or other wellbore orientations. Well system 100 may include one or more additional treatment wells, observation wells, or other types of wells. Subterranean region 104 may include a reservoir that contains hydrocarbon resources, such as oil, natural gas, or others. For example, subterranean region 104 may include all or part of a rock formation (e.g., shale, coal, sandstone, granite, or others) that contains natural gas. Subterranean region 104 may include naturally fractured rock or natural rock formations that are not fractured to any significant degree. Subterranean region 104 may include tight gas formations of low permeability rock (e.g., shale, coal, or others).

Well system 100 may also include injection system 108. In some embodiments, injection system 108 may perform a treatment, for example, by injecting fluid into subterranean region 104 through wellbore 102. In some embodiments, a treatment fractures part of a rock formation or other materials in subterranean region 104. In such examples, fracturing a rock may increase the surface area of a formation, which may increase the rate at which the formation conducts hydrocarbon resources to wellbore 102.

Injection system 108 may be used to perform one or more treatments including, for example, injection treatments or flow back treatments. For example, injection system 108 may apply treatments including single-stage injection treatments, multi-stage injection treatments, mini-fracture test treatments, follow-on fracture treatments, re-fracture treatments, final fracture treatments, other types of fracture treatments, or any suitable combination of treatments. An injection treatment may be, for example, a multi-stage injection treatment where an individual injection treatment is performed during each stage. A treatment may be applied at a single fluid injection location or at multiple fluid injection locations in a subterranean region, and fluid may be injected over a single time period or over multiple different time periods. In some instances, a treatment may use multiple different fluid injection locations in a single wellbore, multiple fluid injection locations in multiple different wellbores, or any suitable combination. Moreover, a treatment may inject fluid through any suitable type of wellbore, such as, for example, vertical wellbores, slant wellbores, horizontal wellbores, curved wellbores, or any suitable combination of these and others.

Injection system 108 may inject treatment fluid into subterranean region 104 through wellbore 102. Injection system 108 may include instrument truck 114, pump truck 116, and injection treatment control subsystem 111. Injection system 108 may include other features not shown in the figures. Although FIG. 1A depicts a single instrument truck 114 and a single pump truck 116, any suitable number of instrument trucks 114 and pump trucks 116 may be used.

Pump trucks 116 may communicate treatment fluids into wellbore 102, for example, through conduit 117, at or near the level of ground surface 106. Pump trucks 116 may include mobile vehicles, immobile installations, skids, hoses, tubes, fluid tanks, fluid reservoirs, pumps, valves, mixers, or other types of structures and equipment. Pump trucks 116 may supply treatment fluid or other materials for a treatment. Pump trucks 116 may contain multiple different treatment fluids, proppant materials, or other materials for different stages of a treatment. Treatment fluids may be communicated through wellbore 102 from ground surface 106 level by a conduit installed in wellbore 102. The conduit may include casing cemented to the wall of wellbore 102. In some embodiments, all or a portion of wellbore 102 may be left open, without casing. The conduit may include a working string, coiled tubing, sectioned pipe, or other types of conduit.

Instrument trucks 114 may include injection treatment control subsystem 111, which controls or monitors the treatment applied by injection system 108. Instrument trucks 114 may include mobile vehicles, immobile installations, or other suitable structures. Injection treatment control subsystem 111 may control operation of injection system 108. Injection treatment control subsystem 111 may include data processing equipment, communication equipment, or other systems that control stimulation treatments applied to subterranean region 104 through wellbore 102. Injection treatment control subsystem 111 may include or be communicatively coupled to a computing system (e.g., computing subsystem 110) that calculates, selects, or optimizes treatment parameters for initialization, propagation, or opening fractures in subterranean region 104. Injection treatment control subsystem 111 may receive, generate or modify a stimulation treatment plan (e.g., a pumping schedule) that specifies properties of a treatment to be applied to subterranean region 104.

Injection system 108 may use multiple treatment stages or intervals, such as stage 118a and stage 118b (collectively "stages 118"). Injection system 108 may delineate fewer stages or multiple additional stages beyond the two exemplary stages 118 shown in FIG. 1A. Stages 118 may each have one or more perforation clusters 120 that include one or more perforations 138. Fractures in subterranean region 104 may be initiated at or near perforation clusters 120 or elsewhere. Stages 118 may have different widths or may be uniformly distributed along wellbore 102. Stages 118 may be distinct, nonoverlapping (or overlapping) injection zones along wellbore 102. In some embodiments, each stage 118 may be isolated from other stages 118, for example, by packers or other types of seals in wellbore 102. In some embodiments, each stage 118 may be treated individually, for example, in series along wellbore 102. Injection system 108 may perform identical, similar, or different injection treatments at different stages 118.

A treatment, as well as other activities and natural phenomena, may generate microseismic events in subterranean region 104. For example, injection system 108 may cause multiple microseismic events 132 during a multi-stage injection treatment. Microseismic data may be collected from subterranean region 104. Microseismic data detected in well system 100 may include acoustic signals generated by natural phenomena, acoustic signals associated with a stimulation treatment applied through wellbore 102, or other types of signals. For instance, sensors 136 may detect acoustic signals generated by rock slips, rock movements, rock fractures or other events in subterranean region 104. In some instances, the locations of individual microseismic events may be determined based on the microseismic data. Microseismic events in subterranean region 104 may occur, for example, along or near induced hydraulic fractures. The microseismic events may be associated with pre-existing natural fractures or hydraulic fracture planes induced by fracturing activities. Microseismic data from a stimulation treatment may include information collected before, during, or after fluid injection.

Wellbore 102 may include sensors 136, microseismic array, and other equipment that may be used to detect microseismic data. Sensors 136 may include geophones or other types of listening equipment. Sensors 136 may be located at a variety of positions in well system 100. In In some embodiments, computing subsystem 110 may be configured to identify subset 134 of microseismic events 132 associated with a single treatment stage (e.g., treatment stage 118*a*) of a multi-stage injection treatment. For example, subset 134 of microseismic events 132 are shown inside a circle in FIG. 1A. In some embodiments, subset 134 of microseismic events 132 may be identified based on a time that they occurred, and subset 134 may be filtered or otherwise modified to exclude outliers or other event points. Subset 134 of microseismic events 132 may be selected from a superset of microseismic events 132 based on any suitable criteria. In some cases, subset 134 of microseismic events 132 may be used to identify a μSRV associated with a particular stage of a treatment, such as stage 118*a*. As shown in FIG. 1A, sensors 136 may be installed at surface 106 and beneath surface 106 (e.g., in an observation well (not shown)). Additionally or alternatively, sensors 136 may be positioned in other locations above or below ground surface 106, in other locations within wellbore 102, or within another wellbore (e.g., another treatment well or an observation well). Wellbore 102 may include additional equipment (e.g., working string, packers, casing, or other equipment) not shown in FIG. 1A.

Sensors 136 or other detecting equipment in well system 100 may detect the microseismic events, and collect and transmit the microseismic data, for example, to computing subsystem 110. Computing subsystem 110 may be located above ground surface 106. Computing subsystem 110 may include one or more computing devices or systems located at the wellbore 102, or in other locations. Computing subsystem 110 or any of its components may be located apart from the other components shown in FIG. 1A. For example, computing subsystem 110 may be located at a data processing center, a computing facility, or another suitable location. In some cases, all or part of computing subsystem 110 may be contained in a technical command center at a well site, in a real-time operations center at a remote location, in another appropriate location, or any suitable combination of these.

Computing subsystem 110 may receive and analyze microseismic data. For example, computing subsystem 110 may analyze microseismic event data from a stimulation treatment of subterranean region 104. Computing subsystem 110 may receive microseismic data at any suitable time. In some instances, computing subsystem 110 may receive microseismic data in real time (or substantially in real time) during a treatment. For example, microseismic data may be sent to computing subsystem 110 upon detection by sensors 136. In some instances, computing subsystem 110 receives some or all of the microseismic data after a fracture treatment has been completed. Computing subsystem 110 may receive the microseismic data in any suitable format. For example, computing subsystem 110 may receive the microseismic data in a format produced by microseismic sensors or detectors, or computing subsystem 110 may receive microseismic data after it has been formatted, packaged, or otherwise processed. Computing subsystem 110 may receive microseismic data, for example, by a wired or wireless communication link, by a wired or wireless network, or by one or more disks or other tangible media.

In some embodiments, computing subsystem 110 may identify an μSRV or other data for a treatment based on microseismic data. This μSRV data may be computed for an individual stage or for a multistage treatment as a whole. In some instances, computed μSRV data may be presented to users to visualize and analyze the temporal and spatial evolution of a μSRV. In some implementations, microseismic data may be collected, communicated, and analyzed in real time during an injection treatment. In some implementations, computed μSRV data may be provided to injection treatment control subsystem 111. A current or a prospective treatment strategy may be adjusted or otherwise managed based on computed μSRV data, for example, to improve the efficiency of the injection treatment.

Computing subsystem 110 may be configured to perform additional or different operations. Computing subsystem 110 may perform, for example, fracture mapping and matching based on collected microseismic event data to identify fracture orientation trends and extract fracture network characteristics. These characteristics may include fracture orientation (e.g., azimuth and dip angle), fracture size (e.g., length, height, surface area), fracture spacing, fracture complexity, μSRV, or another property. In some implementations, computing subsystem 110 may identify a μSRV for a stimulation treatment applied to subterranean region 104, identify overlapping volume of μSRVs between stages of a stimulation treatment, or other information.

Well system 100 and computing subsystem 110 may include or access any suitable communication infrastructure. Communication links 128 may allow instrument trucks 114 to communicate with pump trucks 116, or other equipment at ground surface 106. Additional communication links may allow instrument trucks 114 to communicate with sensors or data collection apparatus in well system 100, remote systems, other well systems, equipment installed in wellbore 102 or other devices and equipment. For example, well system 100 may include multiple separate communication links or a network of interconnected communication links. These communication links may include wired or wireless communications systems. For example, sensors 136 may communicate with instrument trucks 114 or computing subsystem 110 through wired or wireless links or networks, or instrument trucks 114 may communicate with computing subsystem 110 through wired or wireless links or networks. These communication links may include a public data network, a private data network, satellite links, dedicated communication channels, telecommunication links, or any suitable combination of these and other communication links.

Well system 100 may include additional or different features, and the features of well system 100 may be arranged as shown in FIG. 1A, or in another suitable configuration. Some of the techniques and operations described here may be implemented by a computing subsystem configured to provide the functionality described. In various embodiments, a computing system may include any of various types of devices, including, but not limited to, personal computer systems, desktop computers, laptops, notebooks, mainframe computer systems, handheld computers, workstations, tablets, application servers, storage devices, computing clusters, or any type of computing or electronic device.

Figure 1B:
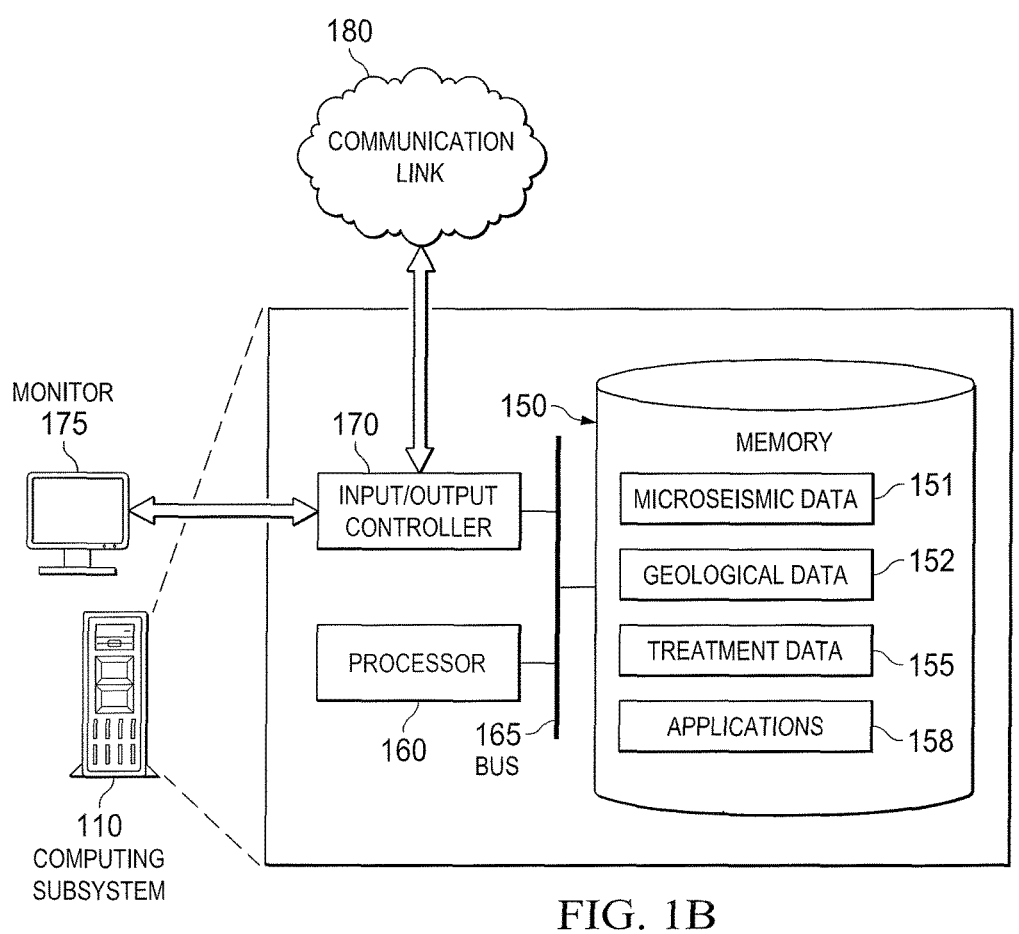
FIG. 1B is a block diagram of an exemplary computing subsystem of FIG. 1A, in accordance with some embodiments of the present disclosure.

FIG. 1B depicts an exemplary computing subsystem 110 of FIG. 1A, in accordance with some embodiments of the present disclosure. Computing subsystem 110 may be located at or near one or more wellbores of well system 100 or at a remote location. All or part of computing subsystem 110 may operate as a component of or independent of well system 100 or independent of any other components shown in FIG. 1A. Computing subsystem 110 may include memory 150, processor 160, and input/output controllers 170 communicatively coupled by bus 165.

Processor 160 may include hardware for executing instructions, such as those making up a computer program, such as application 158. As an example and not by way of limitation, to execute instructions, processor 160 may retrieve (or fetch) the instructions from an internal register, an internal cache, memory 150; decode and execute them; and then write one or more results to an internal register, an internal cache, memory 150. In particular embodiments, processor 160 may include one or more internal caches for data, instructions, or addresses. This disclosure contemplates processor 160 including any suitable number of any suitable internal caches, where appropriate. As an example and not by way of limitation, processor 160 may include one or more instruction caches, one or more data caches, and one or more translation look aside buffers (TLBs). Instructions in the instruction caches may be copies of instructions in memory 150, and the instruction caches may speed up retrieval of those instructions by processor 160. Data in the data caches may be copies of data in memory 150 for instructions executing at processor 160 to operate on; the results of previous instructions executed at processor 160 for access by subsequent instructions executing at processor 160 or for writing to memory 150; or other suitable data. The data caches may speed up read or write operations by processor 160. The TLBs may speed up virtual-address translation for processor 160. In particular embodiments, processor 160 may include one or more internal registers for data, instructions, or addresses. This disclosure contemplates processor 160 including any suitable number of any suitable internal registers, where appropriate. Where appropriate, processor 160 may include one or more arithmetic logic units (ALUs); be a multi-core processor; or include one or more processors 160. Although this disclosure describes and illustrates a particular processor, this disclosure contemplates any suitable processor.

In some embodiments, processor 160 may execute instructions, for example, to generate output data based on data inputs. For example, processor 160 may run application 158 by executing or interpreting software, scripts, programs, functions, executables, or other modules contained in application 158. Processor 160 may perform one or more operations related to FIGS. 2-8. Input data received by processor 160 or output data generated by processor 160 may include microseismic data 151, geological data 152.

Memory 150 may include, for example, random access memory (RAM), a storage device (e.g., a writable read-only memory (ROM) or others), a hard disk, a solid state storage device, or another type of storage medium. Computing subsystem 110 may be preprogrammed or it may be programmed (and reprogrammed) by loading a program from another source (e.g., from a CD-ROM, from another computer device through a data network, or in another manner). In some embodiments, input/output controller 170 may be coupled to input/output devices (e.g., monitor 175, a mouse, a keyboard, or other input/output devices) and to communication link 180. The input/output devices may receive and transmit data in analog or digital form over communication link 180.

Memory 150 may store instructions (e.g., computer code) associated with an operating system, computer applications, and other resources. Memory 150 may also store application data and data objects that may be interpreted by one or more applications or virtual machines running on computing subsystem 110. Memory 150 may include microseismic data 151, geological data 152, and applications 158. In some implementations, a memory of a computing device may include additional or different data, applications, models, or other information.

Microseismic data 151 may include information for microseismic events in a subterranean region. For example, referring to FIG. 1A, microseismic data 151 may include information based on acoustic data collected by sensors 136 at wellbore 102, at surface 106, or at other locations within subterranean region 104. In some embodiments, microseismic data 151 may include information that has been combined with other data, reformatted, or otherwise processed. Microseismic data 151 may include any suitable information relating to microseismic events (e.g., locations, times, magnitudes, moments, uncertainties, etc.). Microseismic data 151 may include data collected from one or more stimulation treatments, which may include data collected before, during, or after a fluid injection.

Geological data 152 may include information on geological properties of subterranean region 104. For example, referring to FIG. 1A, geological data 152 may include information on wellbore 102, or information on other attributes of subterranean region 104. In some embodiments, geological data 152 may include information on lithology, fluid content, stress profile, pressure profile, spatial extent, or other attributes of one or more rock formations in subterranean region 104. Geological data 152 may further include information collected from well logs, rock samples, outcroppings, microseismic imaging, or other data sources.

Treatment data 155 may include information on properties of a planned treatment of subterranean region 104. For example, referring to FIG. 1A, treatment data 155 may include information identifying locations of perforations 138. In some embodiments, treatment data 155 may include information on a pumping schedule for a treatment stage, such a fluid volume, fluid pumping rate, or fluid pumping pressure.

Applications 158 may include software applications, scripts, programs, functions, executables, or other modules that may be interpreted or executed by processor 160. The applications 158 may include machine-readable instructions for performing one or more operations related to FIGS. 2-8. Applications 158 may include machine-readable instructions for generating a user interface or a plot, for example, illustrating fracture geometry (e.g., length, width, spacing, orientation, etc.), geometric representations of μSRV, μSRV overlap, μSRV uncertainty, etc. Applications 158 may obtain input data, such as treatment data 155, geological data 152, microseismic data 151, or other types of input data, from memory 150, from another local source, or from one or more remote sources (e.g., via communication link 180). Applications 158 may generate output data and store output data in memory 150, in another local medium, or in one or more remote devices (e.g., by sending output data via communication link 180).

Communication link 180 may include any type of communication channel, connector, data communication network, or other link. For example, communication link 180 may include a wireless or a wired network, a Local Area Network (LAN), a Wide Area Network (WAN), a private network, a public network (such as the Internet), a WiFi network, a network that includes a satellite link, a serial link, a wireless link (e.g., infrared, radio frequency, or others), a parallel link, or another type of data communication network.

In some implementations, microseismic data may be collected from a stimulation treatment, such as a multi-stage hydraulic fracturing treatment. Based on locations of the microseismic events in a subterranean region, a geometrical representation of the μSRV may be constructed, and a quantitative representation of a μSRV may be calculated based on the geometrical representation. A geometrical representation may include, for example, a three-dimensional (3D) convex hull or a two-dimensional (2D) convex polygon enclosing some or all of the microseismic events. A geometrical representation may include plots, tables, charts, graphs, coordinates, vector data, maps or other geometrical objects. In some implementations, in addition to a volume of a μSRV for a stimulated subterranean region, other geometric properties (e.g., a length, width, height, orientation) of a μSRV may be identified based on a geometrical representation. Geometric properties may be used to characterize a stimulated subterranean region. For example, a geometrical representation may indicate an extension of hydraulic fractures in a stimulated subterranean formation.

In some instances, due to low-amplitude, low-energy microseismic events or low signal-to-noise (SNR) measurements, some uncertainty may be associated with data for each microseismic event. In some embodiments, uncertainty associated with microseismic events may be used to quantify uncertainty of the calculated μSRV. Uncertainty may include, for example, location, moment (e.g., energy or amplitude), time, or another type of uncertainty associated with microseismic events. Uncertainty may reflect accuracy of a μSRV estimation. In some cases, uncertainty may serve as a metric for injection treatment evaluation, injection treatment plan design, or other types of analysis.

In some embodiments, for a multi-stage injection treatment, a μSRV may be identified for each treatment stage. When μSRVs from different stages overlap, an overlap in μSRV between neighboring or geographically close stages may be calculated based on the μSRV of each stage. An overlap in a μSRV between stages may indicate fluid connection between hydraulic fractures created by each stage, and may imply diversion of treatment fluid during a treatment. The magnitude of an overlap in μSRV between stages may correlate to the volume of treatment fluid communicated between these stages through the fluid connection. Thus, μSRV overlap may be used, for example, by users to control a loss of treatment fluid in real-time, to modify (or otherwise manage) a treatment plan.

In some embodiments, an efficiency of a treatment may indicate an amount of a reservoir (e.g., an amount of an unfractured reservoir) contacted by a given fracture treatment. In some instances, the efficiency may be improved or maximized by reducing or minimizing μSRV overlap between two adjacent injection stages. Improving fracturing efficiency via overlap reduction may help reduce costs or provide other benefits.

In some embodiments, geophysical geometry of a μSRV at each stage, overlapping volumes between adjacent stages, a percentage of overlapping volumes over a μSRV of a treatment stage, accuracy or uncertainty of a μSRV, stimulated contact area, or a combination of these and other types of information may be graphically displayed. This information may help users identify or maximize efficiency of a treatment and identify or minimize possible communication between different stages.

Generally, the techniques described here may be performed at any time, for example, before, during, or after a treatment or other event. In some instances, the techniques described may be implemented in real time, for example, during a stimulation treatment. Generating or presenting data in real-time may allow users to visualize the temporal and spatial evolution of a μSRV, dynamically identify a geometry of a μSRV and control development of a μSRV to maximize a μSRV and production. In some instances, physical connection or fluid communication between stimulated regions of multiple stages may be identified in real time and a treatment strategy may be adjusted in real time, for instance, to reduce or avoid loss of treatment fluid into fractures created by other stages, to improve the efficiency of hydraulic fracturing efforts, or to enhance hydrocarbon productivity. In some instances, a real-time μSRV analysis may be combined with real-time hydraulic fracture mapping, for example, to provide additional information about the hydraulic fracturing treatment.

Figure 2A:
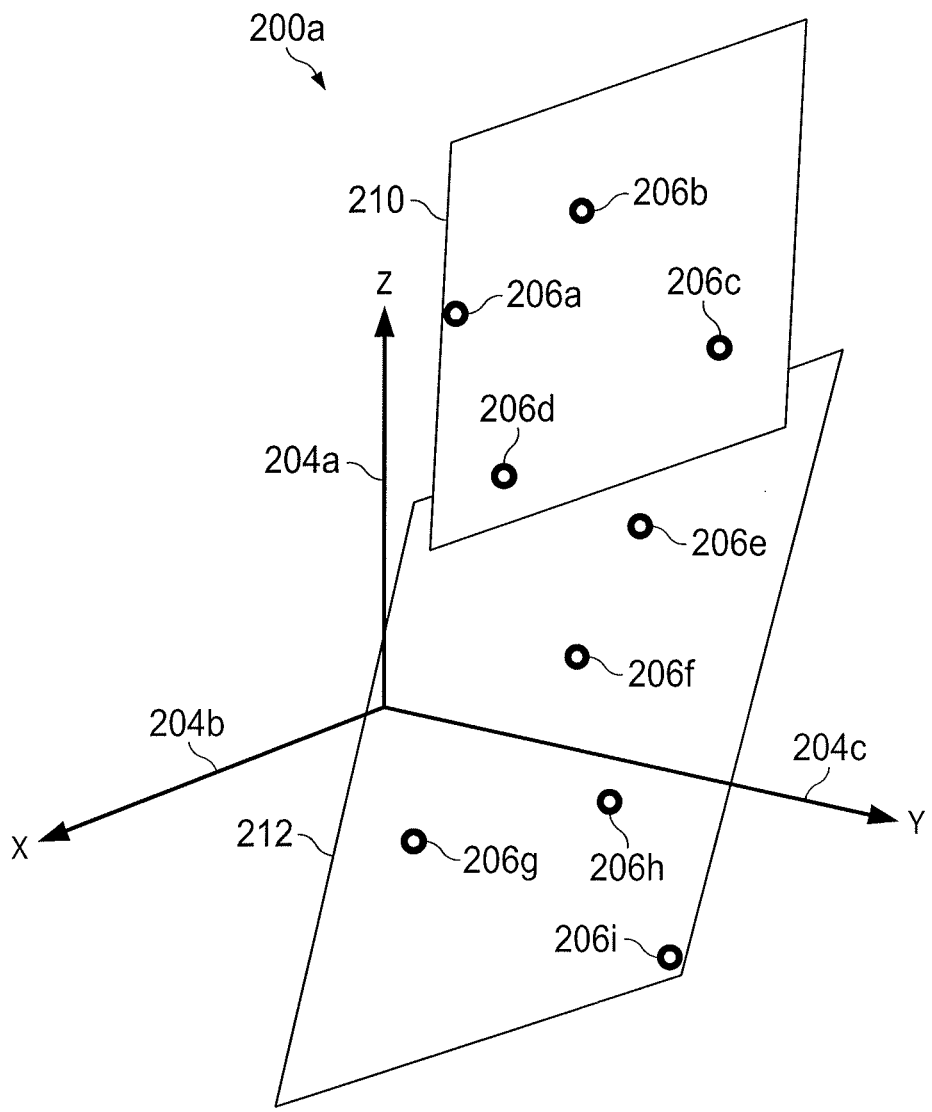
FIG. 2A is a plot showing a perspective view of fracture planes and microseismic events, in accordance with some embodiments of the present disclosure.

In some embodiments, microseismic events may be associated with fracture planes using an iterative matching algorithm. FIG. 2A depicts an exemplary plot 200 showing a perspective view of fracture planes 210 and 212 and microseismic events 206a, 206b, 206c, 206d, 206e, 206f, 206g, 206h, and 206i, in accordance with some embodiments of the present disclosure. Fracture planes 210 and 212 may include rectangular, two-dimensional areas extending through three-dimensional space. Fracture planes 210 and 212 may have other shapes (e.g., triangular, ellipsoidal, polygonal, irregular, etc.). In some cases, fracture planes 210 and 212 may include a three-dimensional volume, for example, to represent the width, aperture, or other features of a fracture.

Parameters of fracture planes 210 and 212 may be defined in any suitable coordinate system. For example, a fracture plane may be defined by the parameters a, b, c, and d of the equation 0=ax+by+cz+d, which defines a plane in an xyz-coordinate system. In other coordinate systems (such as a cylindrical coordinate system, a spherical coordinate system, or a parameterized coordinate system, etc,), a plane in three-dimensional space may be described using other formulations, each including four parameters describing the plane. The boundaries of a fracture plane or an extent of a fracture plane may be defined by a k-vertices polygon, and thus by additional 2 k parameters (e.g., by four microseismic events located on the plane, each with two coordinates, totaling 8 parameters). For example, a boundary of the fracture plane may be defined by a polygon connecting the outermost microseismic events projected onto a fracture plane. In some cases, boundaries of a fracture plane are not defined. For example, a fracture plane may be considered as having infinite extent. In some implementations, a fracture plane may be defined by orientation parameters such as a strike angle and a dip angle.

In some cases, fracture matching may be performed based on a weighted least squares distance algorithm. For example, a fracture plane may be computed based on a weighted sum $S=\Sigma_{i=1}^{N}w_i h_i^2$, where N represents the number of microseismic data points, $w_i$ represents the weighting factor for the $i^{th}$ microseismic event, and $h_i$ represents the distance of the $i^{th}$ microseismic event from a fracture plane. A weighting factor that decreases (e.g., linearly, or nonlinearly) with the distance $h_i$ may be used, or another weighting factor may be used. A fracture plane may be identified by minimizing S with respect to the fracture plane parameters. In some instances, since S is a non-linear function of the plane's parameters, there may be none, a unique, or multiple solutions of the plane's parameters that minimize S. Often, at least one solution exists, and most of the time, multiple solutions exist. Many of these solutions may represent a local minimum for S, and one or more solutions may represent a global minimum of S. To find one or more of the global minimum of S, an iterative algorithm may be needed. Different initial conditions for the iterative algorithm may lead to different solutions (such as a local minimum of S), but only a small set of initial conditions may lead to the global minimum of S. Several techniques may be used to find initial conditions that lead to an appropriate or relevant solution of the plane's parameters. For example, one approach may be based on the natural (partial Hough transforms) histogram for the planes' parameters, and using the most feasible orientations as the initial conditions. Another approach includes viewing microseismic events data set as a cloud in a three dimensional space, and determining three principle axes of a data set in the space (for example, by calculating six entries for the symmetric moment of inertia tensor, and finding its eigenvalues and eigenvectors). A plane that is normal to a vector corresponding to the smallest eigenvalue may be regarded as a good initial condition. Additional or different techniques may be used to identify a good initial condition.

In some embodiments, a weighted least squares distance algorithm may create a fracture plane for any set of initial conditions. For example, in some instances, initial fracture plane parameters may be computed from any non-collinear triplet in a microseismic data set, and a weighted least squares distance algorithm may produce a valid fracture plane regardless of which triplet is used. In many instances, a fracture plane's parameters produced based on a least squares distance algorithm may be close to optimal. In some implementations, a weighted least squares distance algorithm may not be limited by a size of a microseismic data set. For example, in some instances, a complexity of an algorithm does not depend on a number of microseismic events being processed.

Figure 2B:
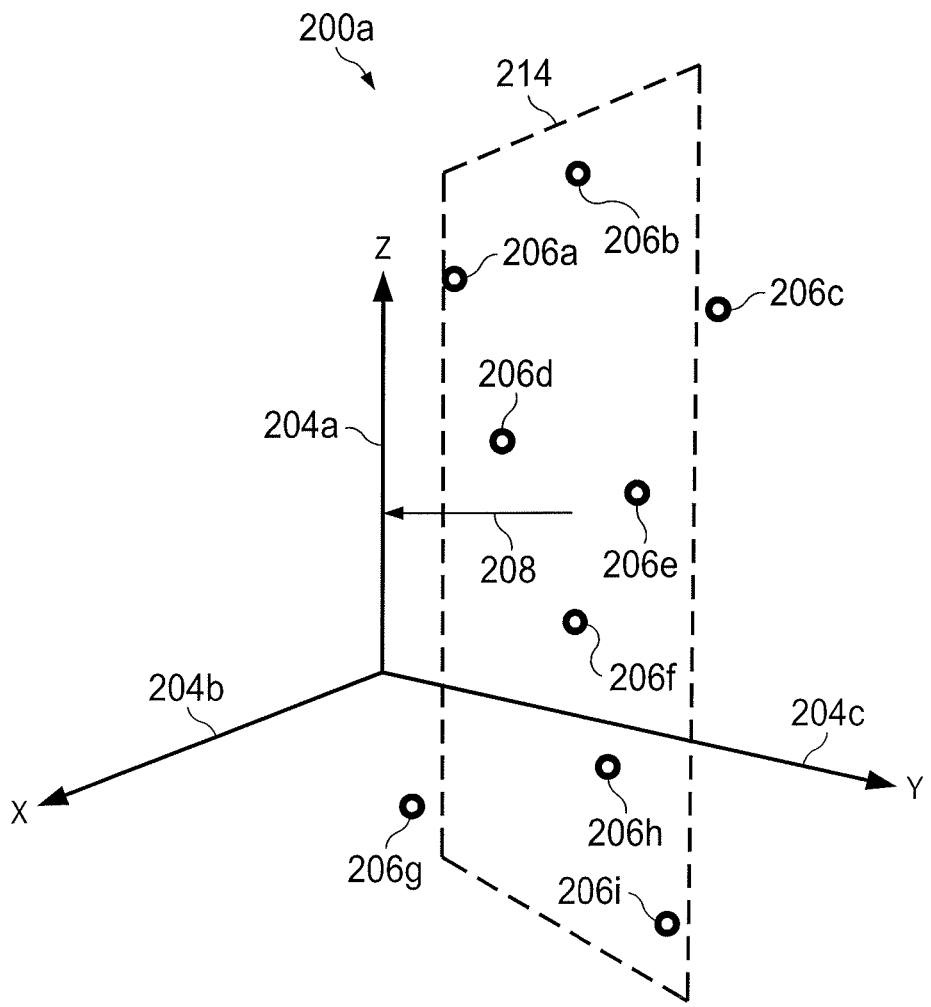
FIG. 2B is a plot showing a perspective view of a merged fracture plane and microseismic events, in accordance with some embodiments of the present disclosure.

FIG. 2B depicts an exemplary plot 200 showing a perspective view of merged fracture plane 214 and microseismic events 206a, 206b, 206c, 206d, 206e, 206f, 206g, 206h, and 206i in accordance with some embodiments of the present disclosure. In some embodiments, an algorithm may iterate over possible dominant orientations to expand feasible fracture planes. In some cases, an algorithm may iterate over a selected subset of possible dominant orientations. The iterations may converge to planes, such as fracture planes 210 or 212, shown in FIG. 2A. Some planes may be approximately equal to each other and some may be close to each other. Two planes may be considered "close" to each other, for example, when the average distance of one plane's events from another plane is less than a given threshold distance. A threshold distance may be designated, for example, as a control parameter. A threshold distance may be designated, for example, in an adaptive manner during an iteration process. An algorithm may merge close planes together and supporting events of one plane may be associated with supporting events of other merged plane(s). For example, an algorithm may merge fracture planes 210 and 212 of FIG. 2A into merged fracture plane 214. A merging algorithm may designate some microseismic events that were associated with the two merging planes to be unassociated with a merged plane. For example, as shown in FIG. 2B, microseismic event 206g may be unassociated with merged fracture plane 214. For certain relative amounts of the new unassociated events, a merge process may be postponed to later stages of the algorithm, or to later time, for a real-time case. In some embodiments, unassociated microseismic events may be excluded from a μSRV.

In some embodiments, fracture matching technology may directly present information about fractures planes associated with three-dimensional microseismic events. Fracture planes may represent fracture networks that exhibit multiple orientations and activate complex fracture patterns. In some cases, hydraulic fracture parameters are extracted from a cloud of microseismic event data; such parameters may include, for example, fracture orientation trends, fracture density, and fracture complexity. Confidence values may be determined for extracted parameters or other information. Fracture parameter and confidence information may be presented to users for example, in a tabular, numerical, or graphical interface or an interface that combines tabular, numerical, and graphical elements. A graphical interface may be presented in real time and may exhibit real-time dynamics of hydraulic fractures. In some instances, this may help users analyze fracture complexity, a fracture network and reservoir geometry, or it may help them better understand a hydraulic fracturing process as it progresses.

In some embodiments, accuracy confidence values are used to quantify the certainty of fracture planes extracted from microseismic data. Accuracy confidence values may be used to classify fractures into confidence levels. For example, three confidence levels (low confidence level, medium confidence level and high confidence level) may be appropriate for some contexts, while in other contexts a different number (e.g., two, four, five, etc.) of confidence levels may be appropriate. A fracture plane's accuracy confidence value may be calculated based on any appropriate data. In some embodiments, a fracture plane's accuracy confidence value may be calculated based on locations of microseismic events and position uncertainties, individual microseismic events' moment magnitudes, distances between microseismic events and an associated fracture plane, a number of microseismic events associated with a fracture plane, and a weight of variation of a fracture orientation, among others.

In general, confidence increases as moment magnitude is larger, as variation of the fraction orientation becomes larger, as a number of associated microseismic events is larger, as accuracy in microseismic event location is larger, or as a variation of a weight as a function of distance is larger. These factors may be used as inputs for defining a weight in an equation for calculating confidence. In some examples, confidence may be calculated according to the equation:

Confidence=(weight of variation of fracture orientation)*($\Sigma_i^{number\ of\ events}$((location uncertainty weight)*(moment magnitude weight)*(distance variation weight)).

Other equations or algorithms may be used to compute the confidence.

Identified fracture planes may be classified into confidence levels based on a fracture plane's confidence values. In some embodiments, three levels are used: low confidence level, medium confidence level and high confidence level. In other embodiments, any suitable number of confidence levels may be used. In some embodiments, when a new event is added to a set of microseismic events associated with an existing fracture plane, its associated fracture confidence parameter may increase, which may cause a fracture plane to move from its current confidence level to a higher one, if it exists. As another example, if a fracture's orientation diverts away from orientation trends exhibited by other microseismic data, confidence may decrease. For example, mainly due to a weight of variation of fracture orientation, a plane may decrease its level to a lower confidence level, if one exists. Fracture orientations may divert from orientations trends particularly in fractures created at an initial time of hydraulic fracturing treatment, but fracture orientations may also divert from orientations trends for other types of fractures in other contexts.

Users may be provided a graphical display of fracture planes identified from microseismic data. In some cases, a graphical display may allow a user to visualize identified planes in a real time fashion, in graphical panels presenting confidence levels. For example, three graphical panels may be used to separately present low confidence level, medium confidence level and high confidence level fracture planes. In some cases, lower confidence level fracture planes may be created in initial times of the fracturing treatment. In some cases, higher confidence level fracture planes propagate in time in the direction nearly perpendicular to the wellbore. As new microseismic events gradually accumulate in time, a graphical display may be updated to enable users to dynamically observe fracture planes association among confidence levels associated with the graphical panels.

Based on microseismic data, identified fracture planes, and confidence values, a μSRV may be obtained. FIG. 3 is a plot 300 showing exemplary microseismic event data collected from a multistage hydraulic fracturing treatment and associated with a fracture plane, in accordance with some embodiments of the present disclosure. In some embodiments, a multi-stage hydraulic fracturing strategy may be used in long horizontal wells to improve stimulated reservoir volume. Microseismic data may be collected at each stage of the multi-stage fracturing treatment. Example plot 300 shows a subset 310 that includes 770 microseismic events (shown as circles) at Stage 1, subset 320 that includes 1201 microseismic events (shown as squares) at Stage 2, subset 330 that includes 476 microseismic events (shown as triangles) at Stage 3, and subset 340 that includes 424 microseismic events (shown as diamonds) at Stage 4. Wellbore 350 and perforation clusters 360 for the exemplary four-stage hydraulic fracturing treatment are also shown. Plot 300 shows microseismic data in a three-dimensional rectilinear coordinate system. The coordinate system is represented by vertical axis 304a and two horizontal axes 304b and 304c. In plot 300, vertical axis 304a represents a range of depths in a subterranean region; horizontal axis 304b represents a range of East-West coordinates; and horizontal axis 304c represents a range of North-South coordinates (all in units of feet). In some embodiments, data represented in FIG. 3 may be represented by another type of geometrical object in any suitable coordinate system (e.g., spherical coordinates, rectangular coordinates, etc.) or domain. Although plot 300 shows distance information in units of feet, other units may be used. For example, calculations may be performed and information may be displayed in metric units (mks, cgs, or another system), standard units, or another unit system. In some cases, an algorithm may use metric units, standard units, or convert among unit systems.

In some embodiments, a μSRV based on microseismic data may be calculated by, for example, filtering microseismic data to identify a selected subset of microseismic events. In some embodiments, microseismic events may be filtered based on time, location, magnitude, moment, or another attributes of microseismic events. In other embodiments, microseismic events may be filtered according to their associated treatment stage. In additional embodiments, microseismic events may be filtered to exclude outliers, low density events, or a combination of these and other factors.

In further embodiments, microseismic events may be filtered to exclude events associated with fracture planes with lower confidence values. For example, fracture planes with a confidence value below a threshold confidence value may be excluded. In some embodiments, the threshold confidence value may be a user input control parameter or it may be configured automatically, for example, by a data processing apparatus, based on system setup, reservoir property, treatment plan, or a combination of these and other parameters. Additionally, microseismic events may be filtered to exclude unassociated microseismic events. Accordingly, a selected subset of microseismic data may be used to calculate a closed boundary to represent a μSRV.

In some embodiments, computing a closed boundary representing a μSRV may include calculating an initial boundary based on multiple microseismic events (e.g., events at extreme locations). This calculated boundary may be iteratively expanded based on a selected subset of microseismic events that reside outside the boundary. As an example, a facet expansion operation may be performed that includes identifying facet expansion groups from a selected subset of microseismic events residing outside a boundary, and expanding facets of a calculated boundary to enclose microseismic events in the expansion groups. In some implementations, a boundary expansion operation may be performed iteratively and result in a boundary that encloses (e.g., contains or intersects) all microseismic events in a selected subset, while some other events (e.g., the filtered outliers, low density events, etc.) may reside outside the boundary. In some implementations, a boundary may be refined, for example, based on further filtering, or smoothing of vertices or edges. An internal volume of the closed boundary may be calculated for a treatment.

In some implementations, before computing a μSRV boundary, outliers in the microseismic data may be identified and removed. Outliers may include, for example, statistical outliers, deterministic outliers, or another type of outlier. In some implementations, outliers may negatively impact the accuracy of a μSRV estimation, for example, when outliers include reflections of events unrelated to stimulation treatment. Excluding outliers may reduce or eliminate interference from other unrelated events to a μSRV identification and may lead to a more accurate estimation of a μSRV for stimulation treatment. In some instances, outliers may deviate from other events, and may be isolated points based on a threshold, a statistical deviation, or another criterion. For example, deterministic outliers may have a location far from other microseismic event locations, moment, or any other attribute and may be attributed to events associated with another wellbore or another stimulation treatment. Deterministic outliers may be identified and cleared, for example, by removing microseismic events with a certain attribute exceeding a threshold. In some implementations, outliers may be detected based on statistical properties of the microseismic data set. For example, statistical outliers may include microseismic events whose distance from an average location of the microseismic events is larger than a threshold. The average location may be, for example, the mean value of the locations $(x_i, y_i, z_i)$, $1 \le i \le k$, of microseismic events in a data set. A threshold may be, for example, the sum of the computed mean value and three (or two, four, etc.) times the standard deviation. In such cases, an example technique to identify the outliers may include calculating a mean and standard deviation for a set of the microseismic events. Additional or different criteria or techniques may be used to detect outliers.

In some embodiments, a calculated boundary may be refined, for example, by filtering out low event density points. For a given event, an event density may be calculated based on, for example, the number of events per unit volume about the event, the average distance to nearest neighbor events, or other information. In some instances, a boundary may have lower event density at its vertices than other places inside the boundary. To obtain more accurate µSRV estimation, events at vertices whose event density is less than a threshold (a parameter) may be removed. The same operation as described above may be used to construct a new boundary based on updated event data to improve a µSRV estimation. In some implementations, a refinement of the calculated boundary may be applied to an initial boundary, a final boundary, an intermediate boundary, or at any appropriate time.

Figure 4:
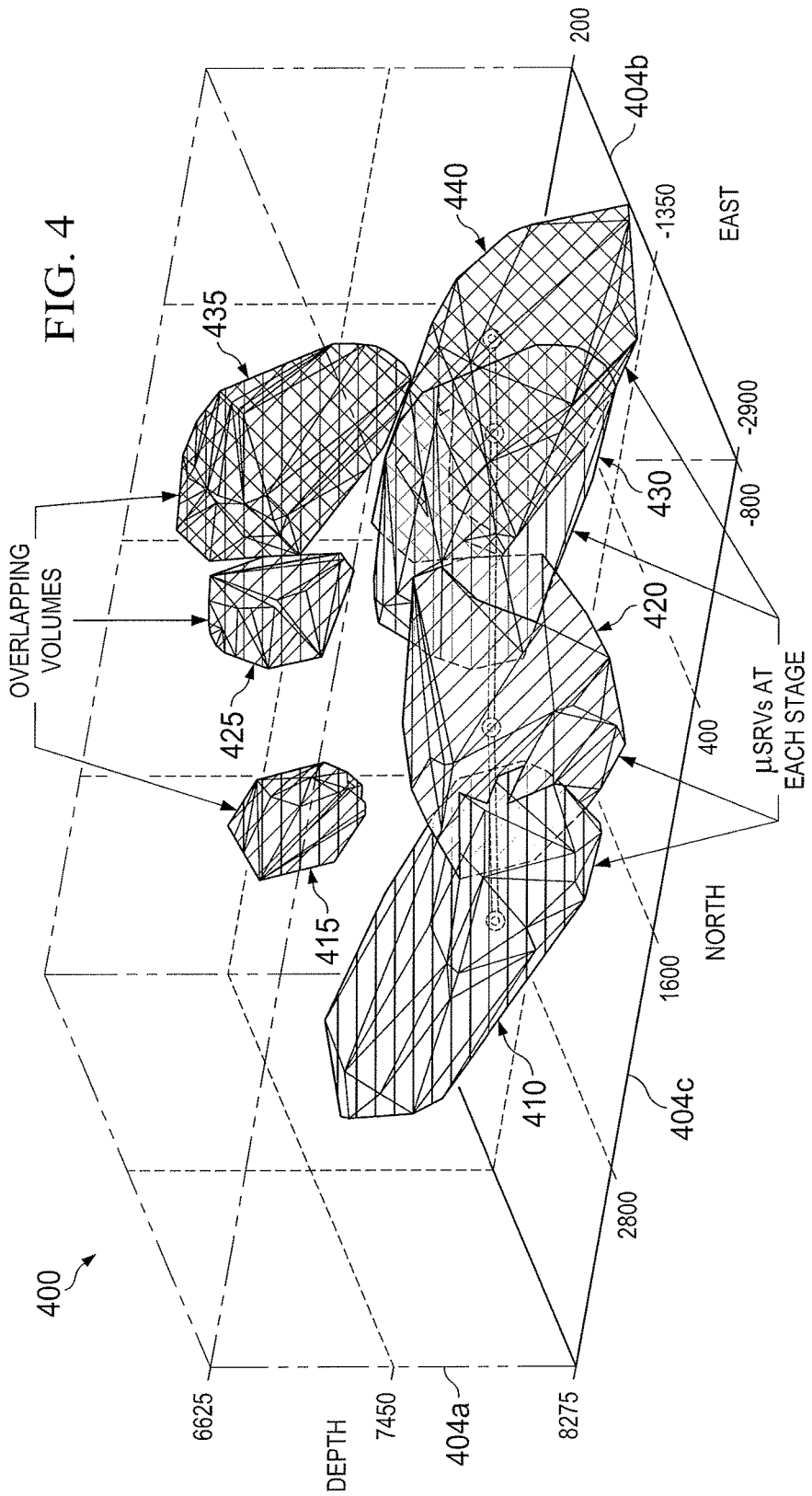
FIG. 4 is a plot showing a three-dimensional (3D) representation of overlapping microseismic supported stimulated reservoir volumes (μSRVs) associated with different stages of a multi-stage injection treatment, in accordance with some embodiments of the present disclosure.

FIG. 4 is a plot 400 showing a three-dimensional (3D) representation of overlapping µSRVs associated with different stages of a multi-stage injection treatment, in accordance with some embodiments of the present disclosure. In plot 400, closed boundaries 410, 420, 430, and 440 are constructed based on the events subsets 310, 320, 330, and 340 in FIG. 3, respectively. Closed boundaries may be constructed according to an example technique described with respect to FIG. 3, or based on another technique. In the example shown in FIG. 4, the µSRVs associated with the four stages are 7.83 $(10)^8$, 9.56 $(10)^8$, 7.74 $(10)^8$ and 8.73 $(10)^8$ cubic feet ($ft^3$) respectively.

In some embodiments, a volume of a closed boundary may be calculated. For example, a center of a boundary, such as the average location of each vertex of the boundary, may be . . . identified. For each facet of the boundary, a tetrahedron may be constructed, where one vertex of the tetrahedron may be the center and the other three vertices may be three vertices of the facet. The volume of a tetrahedron is one-third of the product of the area of the facet and the distance from the center to the facet. Accordingly, the volume of the closed boundary may include a volume corresponding to a sum of the tetrahedrons' volumes. Additional or different techniques may be used to compute a volume of a closed boundary. In some embodiments, a surface area of a µSRV may be calculated by summing areas of each facet of a µSRV.

In some embodiments, a total µSRV for a multi-stage hydraulic fracturing treatment may not be obtained directly from individual µSRVs of each stage because there may be overlapping volumes between the individual µSRVs of each stage. For example, boundaries 415, 425, and 435 of µSRV correspond to overlap regions between µSRVs corresponding to Stage 1 and Stage 2, Stage 2 and Stage 3, and Stage 3 and Stage 4, respectively. In some cases, in addition to neighboring stages, geographically close stages may also overlap or otherwise affect each other. For example, stage 1 and stage 4 may overlap with or otherwise influence each other. In some embodiments, the overlapped volumes indicate possible fluid communication between the stages during the hydraulic fracturing process. Such fluid communication may include the diversion of treatment fluid from a treatment area into a previously treated area, and may correspond to a decrease in the efficiency of an individual treatment stage. A total µSRV for a multi-stage treatment may be calculated based on overlapping volumes. For example, the total µSRV for a two-stage treatment may be calculated according to the equation:

TotalµSRV(Stage1∪Stage2)=µRV(Stage1)+µSRV(Stage2)−µSRV(Stage1∩Stage2)

In some embodiments, based upon µSRV surface area, a fracture aperture may be calculated. For example, an average fracture aperture for a µSRV may be calculated according to the equation:

Fracture aperture=volume of treatment fluid*stimulation effectiveness/µSRV surface area where volume of treatment fluid may be determined with reference to fracture treatment pump schedules.

In some embodiments, analysis and estimation of a µSRV may be performed in real time, for example, during the collection of microseismic data from a treatment. The example techniques described may be applied, for example, to a real-time hydraulic fracturing process.

Figure 5:
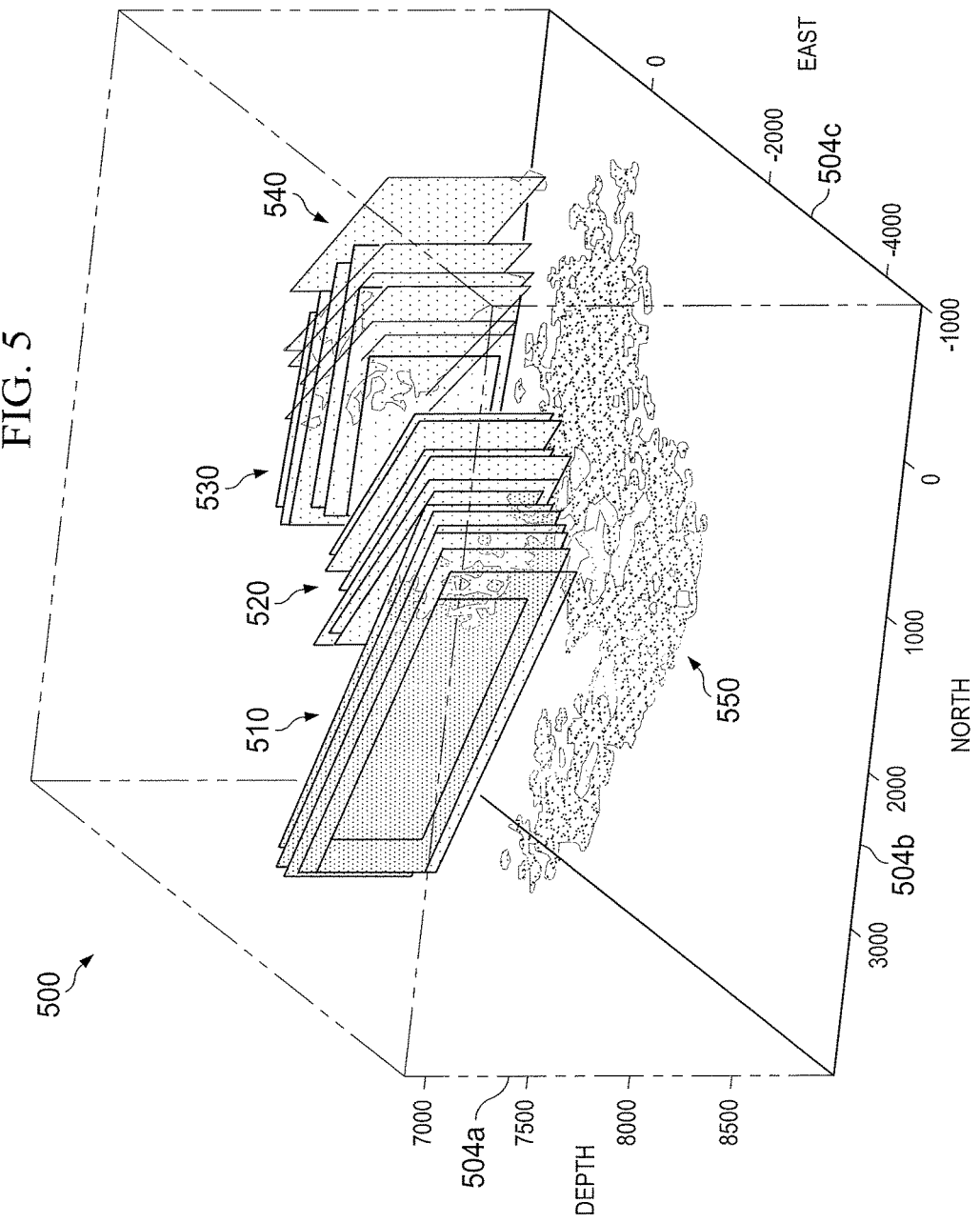
FIG. 5 is a plot showing groups of fracture planes associated with stages included in an exemplary μSRV, in accordance with some embodiments of the present disclosure.

In some embodiments, fracture planes and associated microseismic events included in a µSRV may be used to calculate the dynamic status of a µSRV. FIG. 5 illustrates plot 500 showing groups of fracture planes associated with stages included in an exemplary µSRV, in accordance with some embodiments of the present disclosure. In plot 500, fracture plane groups 510, 520, 530, and 540 include fracture planes associated with events subsets 310, 320, 330, and 340 illustrated in FIG. 3, respectively. Fracture plane groups 510, 520, 530, and 540 may be identified according to the exemplary techniques described with respect to FIGS. 2-4, or based on another technique. In some embodiments, a µSRV estimation may become more accurate as more microseismic events accumulate. For example, a real-time µSRV calculation algorithm may monotonically increase and/or maximize accuracy or confidence levels of particular fracture planes as microseismic events accumulate. Accordingly, µSRV accuracy may depend on the accuracy and/or confidence levels of fractures planes identified from microseismic data.

In some embodiments, in addition to the volume of a µSRV, other geometric properties of a subterranean region may be estimated or otherwise identified based on microseismic data. These geometric properties may include, for example, length, width, height, orientation, or another attribute of fractures planes in the stimulated region. In some embodiments, these geometric properties associated with fracture planes may provide a more adequate and concrete description of a µSRV and an overall fracture network within the stimulated reservoir. In some instances, more information relating to the subterranean region may be extracted based on these geometric properties of individual fracture planes. Users may better visualize, learn, or otherwise analyze the subterranean region, and may manage the stimulation treatment accordingly.

Figure 6:
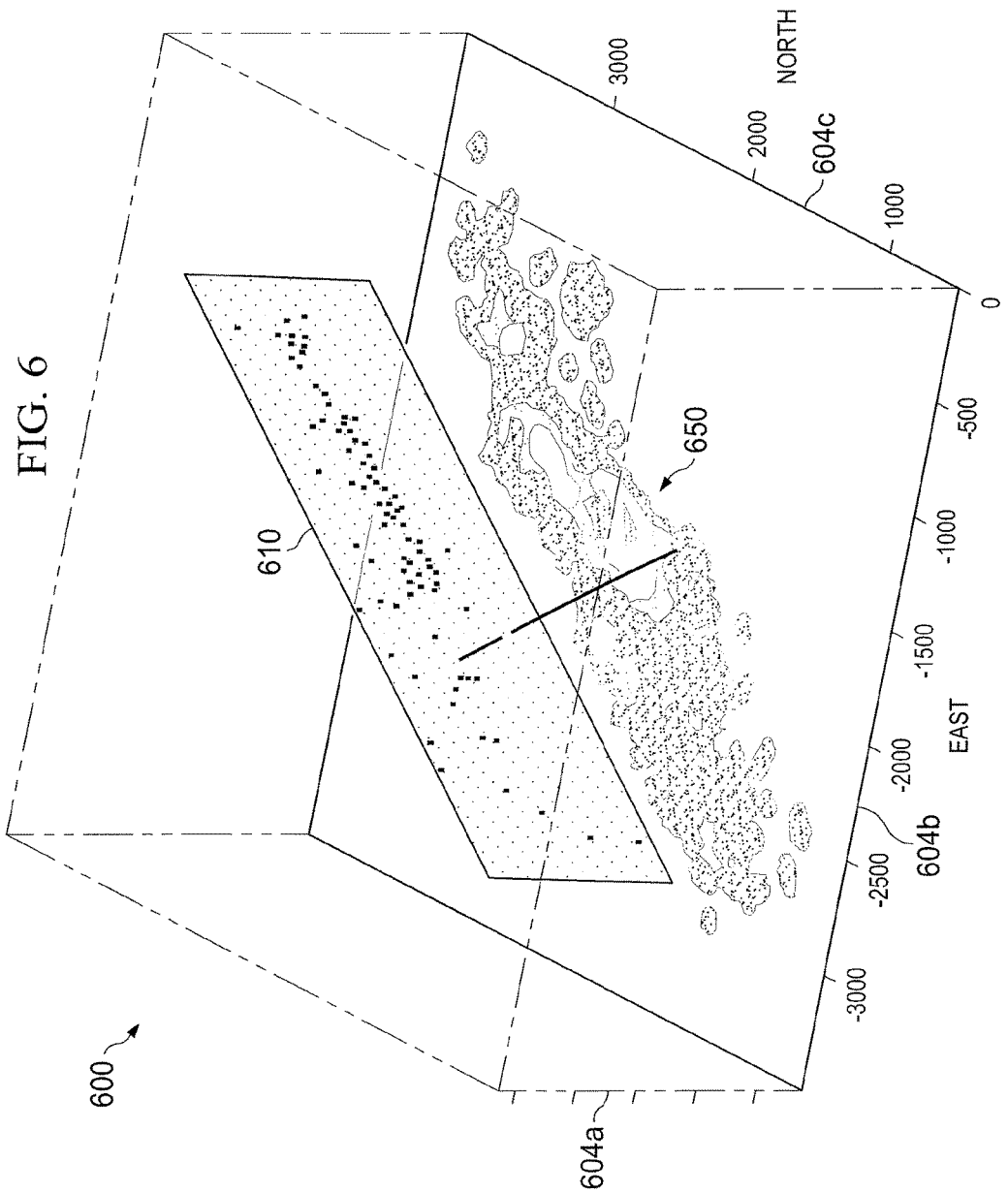
FIG. 6 is a plot showing groups of microseismic events associated with a fracture plane included in an exemplary μSRV, in accordance with some embodiments of the present disclosure.

In some embodiments, a dynamic status of a µSRV may be calculated by iteratively analyzing dynamic properties of individual fracture planes included in the µSRV. FIG. 6 illustrates a plot showing groups of microseismic events associated with a fracture plane included in an exemplary µSRV in accordance with some embodiments of the present disclosure. Plot 600 includes exemplary fracture plane 610 and associated microseismic events 650. Fracture plane 610 may be identified according to the exemplary techniques described with respect to FIGS. 2-5, or based on another technique. In some embodiments, fracture plane 610 may be selected randomly from, for example, fracture plane groups 510, 520, 530 or 540 illustrated in FIG. 5. In other embodiments, multiple instances of fracture plane 610 may be selected iteratively from fracture plane groups 510, 520, 530 or 540 illustrated in FIG. 5.

Figure 7:
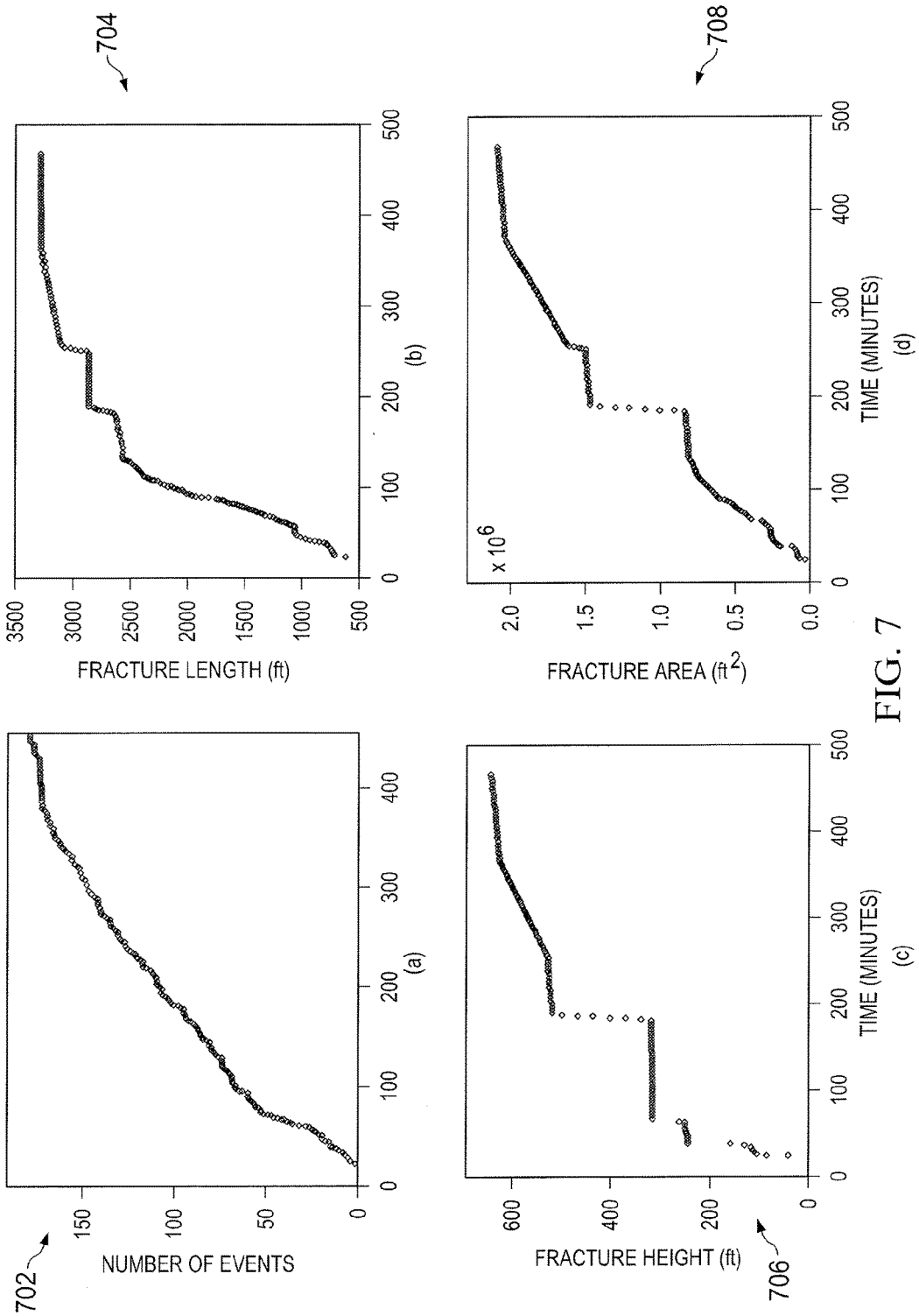
FIG. 7 shows plots depicting dynamic properties of a μSRV, in accordance with some embodiments of the present disclosure.

For example, dynamic accumulation of microseismic events associated with a particular fracture plane may be used to calculate various geometric parameters associated with a μSRV. FIG. 7 illustrates plots 702a-d that depict dynamic properties of a fracture plane, in accordance with some embodiments of the present disclosure. In some embodiments, microseismic events, fractures, and a μSRV may be computed and displayed in real time based on microseismic data. For example, microseismic data associated with a fracture plane may include data corresponding to the time that each microseismic event occurred. Accordingly, geometric properties of the fracture plane may be calculated as a function of time. In some embodiments, a user may visualize, for example, propagation or growth direction, width, shape, or another attribute of fractures and a μSRV. A graphic realization of an identified μSRV boundary and hydraulic fractures may provide a user a direct and intuitive tool to understand a subterranean region, and evaluate, control, design, or otherwise manage a stimulation treatment. In these cases, preventive actions may be taken to control developments of a fracture network and a stimulated region. Additional or different information may be observed or otherwise extracted based on a visualization. For example, plot 702a depicts a time domain graph of a count of microseismic events associated with a fracture plane, such a fracture plane 610 of FIG. 6. Plot 702b depicts a time domain graph of a fracture length associated with a fracture plane, such a fracture plane 610 of FIG. 6. Plot 702c depicts a time domain graph of fracture height associated with a fracture plane, such a fracture plane 610 of FIG. 6. Plot 702d depicts a time domain graph of fracture area associated with a fracture plane, such a fracture plane 610 of FIG. 6.

Figure 8:
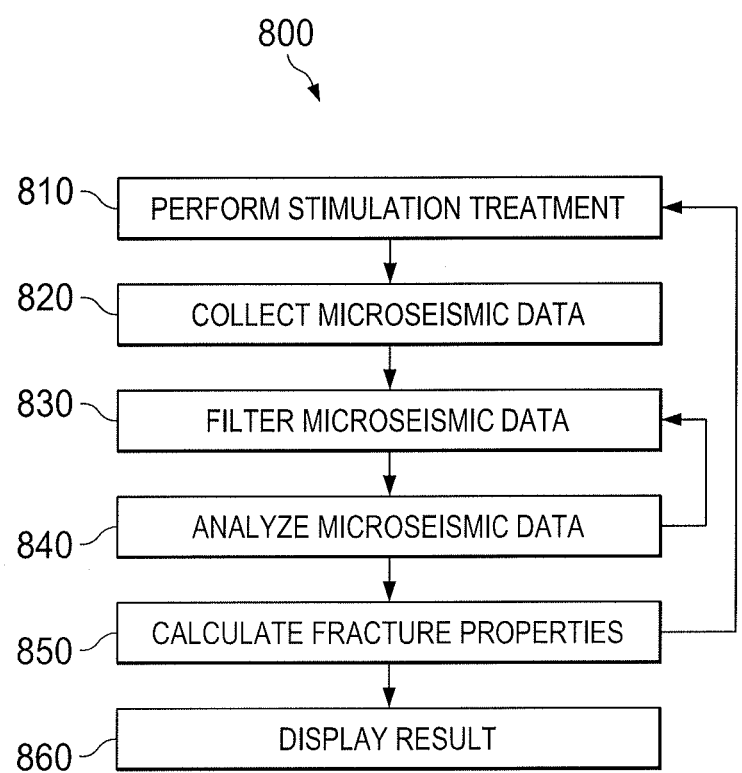
FIG. 8 is a flow chart showing an example process for processing microseismic data, in accordance with some embodiments of the present disclosure.

FIG. 8 is a flow chart showing an example process 800 for processing microseismic data, in accordance with some embodiments of the present disclosure. All or part of the example process 800 may be computer-implemented, for example, using the features and attributes of the example computing subsystem 110 shown in FIG. 1B or other computing systems. Process 800, individual operations of the process 800, or groups of operations may be iterated or performed simultaneously to achieve a desired result. In some cases, process 800 may include the same, additional, fewer, or different operations performed in the same or a different order. Process 800 may be performed on site near a wellbore, at a remote location, or in another location.

At step 810, a treatment may be performed. A treatment may be a single stage injection treatment or a multi-stage injection treatment. The treatment may be performed, for example, by injection system 108, illustrated in FIG. 1A or by another type of system. A treatment may induce and generate microseismic events in a stimulated subterranean region.

At step 820, microseismic data may be collected. Microseismic data may be collected, for example, by sensors (e.g., sensors 136 in FIG. 1A) or other data collection apparatus of an injection treatment system. Microseismic data may be collected before, during, or after a stimulation treatment. In some embodiments, microseismic event data may be collected in real time (or substantially in real time) during a stimulation treatment. For example, microseismic data may be collected during individual stages of a multi-stage injection treatment. Microseismic data may include any suitable information of microseismic events associated with a stimulation treatment of a subterranean region. In some embodiments, microseismic data may be stored in memory (e.g., memory 150 of computing subsystem 110 illustrated in FIG. 1B) of a computing system for storage or further processing.

At step 830, microseismic data may be filtered to exclude events which unlikely to be associated with fracture planes induced by the treatment. Microseismic data may be filtered based on times, locations, uncertainties, magnitude, moment, energy, event density, or a combination of these and other attributes of the microseismic events. In some implementations, microseismic data may include microseismic events associated with multiple stages of a stimulation treatment. In some embodiments, microseismic data may be filtered, for example, by grouping microseismic events associated with respective stages of the multi-stage injection treatment. In other embodiments, microseismic data may be filtered, for example, by grouping microseismic events associated with respective fracture planes associate with a multi-stage injection treatment. In some aspects, microseismic data associated with an entire multi-stage injection treatment may form a superset of microseismic events; the microseismic events associated with each stage or fracture plane may form a respective subset. In some embodiments, microseismic data may be filtered by removing outliers from a subset, a superset, or another set of microseismic events. Outliers may include deterministic outliers, statistical outliers, or another type of outliers. Outliers may include one or more microseismic events with locations outside a range, with uncertainty beyond a threshold, with amplitude, energy, or event density below a threshold, or with other outlier attributes. Outliers may be filtered by removing the microseismic events exceeding an attribute threshold, beyond certain statistical deviation, etc.; or outliers may be filtered in another manner. In other embodiments microseismic data may be filtered based on a confidence value associated with a fracture plane. For example, fracture planes with confidence values below a predetermined threshold may be filtered out. In some embodiments, an attribute threshold (e.g., density threshold, distance threshold, moment threshold, etc.) may be a user input control parameter or it may be configured automatically, for example, by data processing apparatus, based on system setup, reservoir property, treatment plan, or a combination of these and other parameters.

At step 840, microseismic data may be analyzed. In some embodiments, an analysis may be performed based on filtered microseismic data. In some embodiments, analyzing filtered microseismic data may include identifying microseismic supported stimulated reservoir geometry, calculating a μSRV for a stimulation treatment, identifying uncertainty of a μSRV, fracture mapping and matching, or another type of processing. As an example, analyzing filtered microseismic data may include constructing a closed boundary of filtered microseismic events and calculating a volume based on the closed boundary. In some embodiments, analyzing microseismic data may include identifying a treatment stage associate with a fracture plane. In other embodiments, analyzing filtered microseismic data may include constructing a closed boundary of filtered microseismic events for each treatment stage and calculating an μSRV based on the closed boundary. In other embodiments, analyzing filtered microseismic data may include identifying overlap between stages of μSRVs associated with different treatment stages.

In some implementations, filtering and analyzing the microseismic data may be an iterative process with a terminating condition. For example, after analyzing microseismic data at step 840, process 800 may return to 830 for further microseismic data filtering. In some instances, filtering may be based on an analyzed result at 840. For instance, microseismic events may be filtered by removing low event density events that are vertices of a constructed boundary at 840. In other embodiments, a predetermined threshold for a confidence value may be adjusted. Microseismic data may be filtered based on additional or different criteria. Filtered microseismic data may be analyzed at 840 again, for example, for constructing an improved boundary. In some implementations, filtering and analyzing microseismic data may be repeated until, for example, a predefined number of iterations is reached, outliers and low density events have been filtered, or another terminating condition is reached. In some embodiments, microseismic data may be filtered and analyzed in real time (or substantially in real time) during a stimulation treatment, or at another suitable time. In some embodiments, an analysis process at 840 may include the filtering process at 830.

At step 850, fracture properties may be calculated. In some embodiments, calculated fracture properties may include fracture height, fracture length, fracture area, or fracture aperture. In some embodiments, time dependent fracture properties may be calculated based upon microseismic event times of the microseismic events associated with a μSRV, a fracture plane, or a group of fracture planes. Some example microseismic data analysis techniques are described with respect to FIGS. 2A-7. Calculating fracture properties may include additional or different parameters.

At 860, analyzed result may be displayed. For example, an analyzed result may be displayed on a screen or another type of display apparatus. In some embodiments, an analyzed result may be displayed, for example, in real time (or substantially real time) as the microseismic data are analyzed, after a final result is obtained, or at another time (e.g., when requested by a user). The analyzed result may include, for example, a geometrical representation of SRV, extensions of hydraulic fractures, or a combination of these and other types of visualizations. In some instances, the analyzed result may include a quantity of calculated μSRV, uncertainty or accuracy of a μSRV, an overlapping volume of μSRVs, a percentage of the overlapping volume over the μSRV of a treatment stage or of an entire injection treatment, or other information. FIGS. 2A-7 show example displays of analyzed results. Based on the displayed result, efficiency of a stimulation treatment may be evaluated. In some instances, a current or a prospective injection plan (e.g., injection schedules of future treatment stages, parameters of injection treatment, diversion techniques, etc.) may be adjusted based on the result.

In some implementations, some or all of the operations in the example processes (e.g., process 800) are executed in real time during a fracture treatment. An operation may be performed in real time, for example, by performing the operation in response to receiving data (e.g., from a sensor or monitoring system) without substantial delay. An operation may be performed in real time, for example, by performing the operation while monitoring for additional microseismic data from the stimulation treatment. Some real time operations may receive an input and produce an output during a fracture treatment; in some instances, the output is made available to a user within a time frame that allows the user to respond to the output, for example, by modifying the fracture treatment.

In some cases, some or all of the operations in the example processes (e.g., processes 800) are executed dynamically during a fracture treatment. An operation may be executed dynamically, for example, by iteratively or repeatedly performing the operation based on additional inputs, for example, as the inputs are made available. In some instances, dynamic operations are performed in response to receiving data for a new microseismic event (or in response to receiving data for a certain number of new microseismic events, etc.).

Some implementations of subject matter and operations described in this specification may be implemented in digital electronic circuitry, or in computer software, firmware, or hardware, including the structures disclosed in this specification and their structural equivalents, or in combinations of one or more of them. Some implementations of subject matter described in this specification may be implemented as one or more computer programs, i.e., one or more modules of computer program instructions, encoded on computer storage mediums for execution by, or to control the operation of, data processing apparatus. A computer storage medium may be, or may be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially generated propagated signal. The computer storage medium may also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus may include special purpose logic circuitry, e.g., an FPGA (field programmable gate array) or an ASIC (application specific integrated circuit). The apparatus may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing and grid computing infrastructures.

A computer program (also known as a program, software, software application, script, or code) may be written in any form of programming language, including compiled or interpreted languages, as well as declarative or procedural languages. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and are interconnected by a communication network.

Some of the processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory may be supplemented by, or incorporated in, special purpose logic circuitry.

To provide for interaction with a user, operations may be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

A client and server are generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). The relationship of client and server arises by virtue of computer programs running on the respective computers and having a client-server relationship to each other.

Embodiments disclosed herein include:

A. A method that includes obtaining microseismic data corresponding to a treatment of a subterranean region, the microseismic data comprising a microseismic event location for each of the plurality of microseismic events, calculating a plurality of fracture planes based upon the microseismic event locations, calculating a closed boundary enclosing a first subset of the plurality of fracture planes, and identifying a microseismic supported stimulated reservoir volume (μSRV) for the treatment based on the closed boundary.

B. A non-transitory computer-readable medium storing instructions that, when executed by data processing apparatus, perform operations that include obtaining microseismic data corresponding to a treatment of a subterranean region, the microseismic data including a microseismic event location for each of the plurality of microseismic events, calculating a plurality of fracture planes based upon the microseismic event locations, calculating a closed boundary enclosing a first subset of the plurality of fracture planes, and identifying a microseismic supported stimulated reservoir volume (μSRV) for the treatment based on the closed boundary.

C. A well system, including a wellbore, an injection subsystem configured to implement a treatment, a sensor configured to record microseismic events, a computing subsystem, and operably connected to the sensor, wherein the computing subsystem includes computer program instructions that, when executed by the computing subsystem, perform operations including obtaining, from the sensor, microseismic data corresponding to a treatment of a subterranean region, the microseismic data including a microseismic event location for each of the plurality of microseismic events, calculating a plurality of fracture planes based upon the microseismic event locations, calculating a closed boundary enclosing a first subset of the plurality of fracture planes, identifying a microseismic supported stimulated reservoir volume (μSRV) for the treatment based on the closed boundary.

Each of embodiments A, B, and C may have one or more of the following additional elements in any combination: Element 1: wherein the first subset of the plurality of fracture planes includes each fracture plane associated with a single stage in a multi-stage injection treatment, and the μSRV is identified as the μSRV for the single stage. Element 2: wherein the closed boundary includes a first closed boundary and the μSRV comprises a first μSRV, and the method further includes calculating a second closed boundary enclosing a second subset of the plurality of fracture planes, identifying a second μSRV for the treatment based on the closed boundary, and identifying an overlap between the first μSRV and the second μSRV. Element 3: wherein the first and second subsets exclude fracture planes with a confidence value below a predetermined threshold. Element 4: wherein the microseismic data further includes a microseismic event time for each of a plurality of microseismic events, and the method further comprises calculating a dynamic property of a fracture plane based on the plurality of microseismic event locations associated with the fracture plane and the plurality of microseismic event times associated with the fracture plane. Element 5: wherein the dynamic property of the fracture plane is selected from the group comprising fracture length, fracture height, and fracture area. Element 6: further comprising displaying the boundary as a geometric object in real time during the treatment.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

While this specification contains many details, these should not be construed as limitations on the scope of what may be claimed, but rather as descriptions of features specific to particular examples. Certain features that are described in this specification in the context of separate implementations may also be combined. Conversely, various features that are described in the context of a single implementation may also be implemented in multiple implementations separately or in any suitable subcombination.

A number of examples have been described. Nevertheless, it will be understood that various modifications may be made. Accordingly, other implementations are within the scope of the following claims.

What is claimed is:

1. A method comprising:
    obtaining microseismic data corresponding to a treatment of a subterranean region, the microseismic data comprising a microseismic event location for each of a plurality of microseismic events;
    calculating a plurality of fracture planes based upon the microseismic event locations;
    calculating a closed boundary enclosing a first subset of the plurality of fracture planes;
    identifying a microseismic supported stimulated reservoir volume (µSRV) for the treatment based on the closed boundary; and
    modifying a treatment plan for the subterranean region based, at least in part, on the µSRV.

2. The method of claim 1, wherein the first subset of the plurality of fracture planes includes each fracture plane associated with a single stage in a multi-stage injection treatment, and the µSRV is identified as the µSRV for the single stage.

3. The method of claim 2, wherein the closed boundary comprises a first closed boundary and the µSRV comprises a first µSRV, and the method further comprises:
    calculating a second closed boundary enclosing a second subset of the plurality of fracture planes;
    identifying a second µSRV for the treatment based on the closed boundary; and
    identifying an overlap between the first µSRV and the second µSRV.

4. The method of claim 3, wherein the first and second subsets exclude fracture planes with a confidence value below a predetermined threshold.

5. The method of claim 1, wherein the microseismic data further comprises a microseismic event time for each of the plurality of microseismic events; and
    the method further comprises calculating a dynamic property of a fracture plane based on the plurality of microseismic event locations associated with the fracture plane and the plurality of microseismic event times associated with the fracture plane.

6. The method of claim 5, wherein the dynamic property of the fracture plane is selected from the group comprising fracture length, fracture height, and fracture area.

7. The method of claim 1, further comprising displaying the boundary as a geometric object in real time during the treatment.

8. A non-transitory computer-readable medium storing instructions that, when executed by data processing apparatus, perform operations comprising:
    obtaining microseismic data corresponding to a treatment of a subterranean region, the microseismic data comprising a microseismic event location for each of a plurality of microseismic events;
    calculating a plurality of fracture planes based upon the microseismic event locations;
    calculating a closed boundary enclosing a first subset of the plurality of fracture planes;
    identifying a microseismic supported stimulated reservoir volume (µSRV) for the treatment based on the closed boundary; and
    modifying a treatment plan for the subterranean region based, at least in part, on the µSRV.

9. The non-transitory computer-readable medium of claim 8, wherein the first subset of the plurality of fracture planes includes each fracture plane associated with a single stage in a multi-stage injection treatment, and the µSRV is identified as the µSRV for the single stage.

10. The non-transitory computer-readable medium of claim 9, wherein the closed boundary comprises a first closed boundary and the µSRV comprises a first µSRV, and the instructions further perform operations comprising:
    calculating a second closed boundary enclosing a second subset of the plurality of fracture planes; and
    identifying a second µSRV for the treatment based on the closed boundary; and
    identifying an overlap between the first µSRV and the second µSRV.

11. The non-transitory computer-readable medium of claim 10, wherein the first and second subsets exclude fracture planes with a confidence value below a predetermined threshold.

12. The non-transitory computer-readable medium of claim 8, wherein the microseismic data further comprises a microseismic event time for each of the plurality of microseismic events; and
    wherein the instructions further perform operations comprising calculating a dynamic property of a fracture plane based on the plurality of microseismic event locations associated with the fracture plane and the plurality of microseismic event times associated with the fracture plane.

13. The non-transitory computer-readable medium of claim 12, wherein the dynamic property of the fracture plane is selected from the group comprising fracture length, fracture height, and fracture area.

14. The non-transitory computer-readable medium of claim 8, wherein the instructions further perform operations comprising displaying the boundary as a geometric object in real time during the treatment.

15. A well system, comprising:
a wellbore;
an injection subsystem configured to implement a treatment;
a sensor configured to record microseismic events;
a computing subsystem, and operably connected to the sensor;
wherein the computing subsystem comprises computer program instructions that, when executed by the computing subsystem, perform operations comprising:
obtaining, from the sensor, microseismic data corresponding to a treatment of a subterranean region, the microseismic data comprising a microseismic event location for each of a plurality of microseismic events;
calculating a plurality of fracture planes based upon the microseismic event locations;
calculating a closed boundary enclosing a first subset of the plurality of fracture planes;
identifying a microseismic supported stimulated reservoir volume (µSRV) for the treatment based on the closed boundary; and
modifying a treatment plan for the subterranean region based, at least in part, on the µSRV.

16. The well system of claim 15, wherein the first subset of the plurality of fracture planes includes each fracture plane associated with a single stage in a multi-stage injection treatment, and the µSRV is identified as the µSRV for the single stage.

17. The well system of claim 16, wherein the closed boundary comprises a first closed boundary and the µSRV comprises a first µSRV, and the operations further comprise:
calculating a second closed boundary enclosing a second subset of the plurality of fracture planes; and
identifying a second µSRV for the treatment based on the closed boundary; and
identifying an overlap between the first µSRV and the second µSRV.

18. The well system of claim 17, wherein the first and second subsets exclude fracture planes with a confidence value below a predetermined threshold.

19. The well system of claim 15, wherein the microseismic data further comprises a microseismic event time for each of the plurality of microseismic events; and
wherein the instructions further perform operations comprising calculating a dynamic property of a fracture plane based on the plurality of microseismic event locations associated with the fracture plane and the plurality of microseismic event times associated with the fracture plane.

20. The well system of claim 19, wherein the dynamic property of the fracture plane is selected from the group comprising fracture length, fracture height, and fracture area.

* * * * *